United States Patent
Suzuki et al.

(10) Patent No.: US 12,404,183 B2
(45) Date of Patent: Sep. 2, 2025

(54) TITANIUM OXIDE POWDER AND METHOD FOR PRODUCING SAME

(71) Applicant: Resonac Corporation, Tokyo (JP)

(72) Inventors: Genki Suzuki, Tokyo (JP); Hideaki Chikami, Tokyo (JP); Kei Mizue, Tokyo (JP)

(73) Assignee: Resonac Corporation, Tokyo (JP)

(*) Notice: Subject to any disclaimer, the term of this patent is extended or adjusted under 35 U.S.C. 154(b) by 0 days.

(21) Appl. No.: 18/864,672

(22) PCT Filed: Dec. 27, 2023

(86) PCT No.: PCT/JP2023/046902
§ 371 (c)(1),
(2) Date: Nov. 11, 2024

(87) PCT Pub. No.: WO2025/141757
PCT Pub. Date: Jul. 3, 2025

(65) Prior Publication Data
US 2025/0214858 A1    Jul. 3, 2025

(51) Int. Cl.
*C01G 23/047* (2006.01)

(52) U.S. Cl.
CPC ........ *C01G 23/047* (2013.01); *C01P 2002/72* (2013.01); *C01P 2002/86* (2013.01); *C01P 2006/12* (2013.01); *C01P 2006/22* (2013.01); *C01P 2006/80* (2013.01)

(58) Field of Classification Search
CPC .................................................. C01G 23/047
See application file for complete search history.

(56) References Cited

FOREIGN PATENT DOCUMENTS

| | | |
|---|---|---|
| CN | 102086047 A | 6/2011 |
| JP | 6-340421 A | 12/1994 |
| JP | 2005-187294 A | 7/2005 |
| JP | 2008-247712 A | 10/2008 |
| JP | 2010-95392 A | 4/2010 |
| JP | 2011-63496 A | 3/2011 |
| JP | 2015-212355 A | 11/2015 |
| JP | 2022-140479 A | 9/2022 |
| KR | 10-2018-0077220 A | 7/2018 |
| WO | 2015/033421 A1 | 3/2015 |
| WO | 2020/170918 A1 | 8/2020 |
| WO | WO-2021117568 A1 * | 6/2021 ........... C01G 23/047 |

OTHER PUBLICATIONS

Massimo Tawfilas et al., "Surface Characterization of TiO$_2$ Polymorphic Nanocrystals through $^1$H-TD-NMR", Langmuir, Jul. 17, 2018, vol. 34, No. 32, pp. 9460-9469, 10 pages.

Written Opinion for International Application No. PCT/JP2023/046902 dated Mar. 19, 2024.

* cited by examiner

*Primary Examiner* — James A Fiorito
(74) *Attorney, Agent, or Firm* — Sughrue Mion, PLLC

(57) ABSTRACT

What is provided is a titanium oxide powder having a BET specific surface area of 300 m$^2$/g to 480 m$^2$/g as measured through a nitrogen adsorption method, an anatase content of a crystalline phase of 90% or more as measured through XRD measurement, and a spin-spin relaxation time T2 of 46 ms to 103 ms obtained by performing pulsed NMR measurement of a 5 mass % suspension prepared using ion exchange water.

5 Claims, No Drawings

TITANIUM OXIDE POWDER AND METHOD FOR PRODUCING SAME

CROSS REFERENCE TO RELATED APPLICATIONS

This is a National Stage Application of International Application No. PCT/JP2023/046902 filed Dec. 27, 2023.

TECHNICAL FIELD

The present invention relates to a titanium oxide powder and a method for producing the same.

BACKGROUND ART

Titanium (IV) oxide ($TiO_2$) is a chemically stable material that is used industrially in a wide range of fields as a white pigment or the like. In addition, titanium (IV) oxide also reacts with barium carbonate to form barium titanate. Barium titanate is known to be utilized as a material for multilayer ceramic capacitors, which are components in smartphones and the like.

There are three main crystal structures known for titanium oxide: an anatase phase, a brookite phase, and a rutile phase. In particular, anatase-type titanium oxide has more hydroxyl groups on its surface than other crystalline phases, making it highly hydrophilic and highly dispersive. In addition, since anatase-type titanium oxide has many hydroxyl groups on its surface, it has high surface reactivity with other metallic elements and is in high demand as a raw material for dielectric materials and battery materials. In recent years, anatase-type titanium oxide fine particles with high specific surface area have been in demand to achieve higher functionality in these applications.

On the other hand, as particles become finer, their surface free energy increases, which makes them more likely to aggregate with each other and deteriorates dispersibility. To suppress particle aggregation, a production method has been reported in which the particle surface is modified with a modifier such as a silane agent and dispersed in a dispersion containing an amine agent or the like for stabilization, as described in Patent Document 1.

Generally, when mixing nanoparticles together, a technique of mixing them together with an aqueous solvent or an alcohol solvent is used. Therefore, a technique of increasing hydrophilicity of particle surfaces to increase their affinity with the solvents is used. There are techniques to improve the hydrophilicity of particle surfaces by modifying the particle surfaces with polymers containing silicon and the like as described in Patent Document 2 or 3.

CITATION LIST

Patent Document

Patent Document 1: Japanese Unexamined Patent Application, First Publication No. 2008-247712
Patent Document 2: Japanese Unexamined Patent Application, First Publication No. 2015-212355
Patent Document 3: Japanese Unexamined Patent Application, First Publication No. 2010-95392

SUMMARY OF INVENTION

Technical Problem

However, although the production method of Patent Document 1 can produce a dispersion of nanoparticles, it is difficult to control the concentration during production and storage in the form of a dispersion. Therefore, the dispersion obtained through the production method disclosed in Patent Document 1 is not suitable for preparation of titanium oxide for electronic device applications such as dielectric materials or battery materials, which require strict composition control. In addition, since silicon and phosphorus contained in dispersants have a significant effect on main properties such as dielectric constant and conductivity of materials for electronic device applications, they are not suitable as electronic device materials.

In addition, titanium oxide described in Patent Document 2 or 3 is not suitable for electronic device materials because it contains a large amount of silicon.

Therefore, highly dispersive anatase-type titanium oxide ultrafine particles in dry powder form that can be uniformly mixed with other raw materials after strict composition calculations when used as an electronic device material are required. In addition, in order not to degrade the properties of electronic device materials, it is concurrently required for the anatase-type titanium oxide fine particle powder not to contain metalloid elements such as silicon and phosphorus, metallic elements such as sodium and magnesium, and polymer organic acid chains such as polyols.

An object of the present invention is to provide an anatase-type titanium oxide powder with high specific surface area and high dispersibility and a method for producing the same.

Solution to Problem

The inventor has found that by synthesizing anatase-type titanium oxide through hydrolysis of titanium tetrachloride in the presence of dispersants such as urea, an ammonium compound, an inorganic acid, and an organic acid and drying the synthesized titanium oxide in an atmosphere with an initial relative humidity of 70% to 100%, dense aggregation and particle growth between particles can be suppressed, and by obtaining a dry powder without inactivating hydroxyl groups on the surface of the particles, an anatase-type titanium oxide powder with high specific surface area and high affinity with a solvent can be obtained.

The configuration of the present invention for achieving the above-described object is as follows.

(1) A titanium oxide powder according to one aspect of the present invention has a BET specific surface area of 300 $m^2/g$ to 480 $m^2/g$ as measured through a nitrogen adsorption method, an anatase content of a crystalline phase of 90% or more as measured through XRD measurement, and a spin-spin relaxation time T2 of 46 ms to 103 ms obtained by performing pulsed NMR measurement of a 5 wt % suspension prepared using ion exchange water.

(2) In the titanium oxide powder according to (1) above, a carbon content may be 0.5 mass % or less.

(3) In the titanium oxide powder according to (1) or (2) above, a chlorine content may be 0.1 mass % or less, a silicon content may be 0.1 mass % or less, and a sulfur content may be 0.1 mass % or less.

(4) In the titanium oxide powder according to any one of (1) to (3), a half width of a diffraction peak with diffraction angles 2θ of 24.5° to 26.0° may be 1.10° to 2.00°.

(5) The titanium oxide powder according to any one of (1) or (4) may have a zeta potential of −63 mV to −40 mV.

(6) A method for producing a titanium oxide powder according to one aspect of the present invention includes: a synthesis step of mixing an aqueous solution containing urea with an aqueous solution containing titanium tetrachloride and having a pH of less than 3 so that urea/Ti (molar ratio) is 0.001 to 0.058 to precipitate titanium oxide; and a drying treatment step of drying the resulting titanium oxide in an atmosphere with an initial relative humidity of 70% to 100% to powder it.

(7) A method for producing a titanium oxide powder according to one aspect of the present invention includes: a synthesis step of mixing an aqueous solution containing an ammonium compound with an aqueous solution containing titanium tetrachloride and having a pH of less than 3 so that ammonium compound/Ti (molar ratio) is 0.001 to 0.029 to precipitate titanium oxide; and a drying treatment step of drying the resulting titanium oxide in an atmosphere with an initial relative humidity of 70% to 100% to powder it.

(8) In the method for producing a titanium oxide powder according to (6) or (7) above, the aqueous solution containing at least any of urea or an ammonium compound may have a pH less than 12.0.

(9) A method for producing a titanium oxide powder according to one aspect of the present invention includes: a synthesis step of mixing an aqueous solution containing an inorganic acid with an aqueous solution containing titanium tetrachloride and having a pH of less than 3 so that inorganic acid/Ti (molar ratio) is 0.001 to 0.030 to precipitate titanium oxide; and a drying treatment step of drying the resulting titanium oxide in an atmosphere with an initial relative humidity of 70% to 100% to powder it.

(10) A method for producing a titanium oxide powder according to one aspect of the present invention includes: a synthesis step of mixing an aqueous solution containing an organic acid with an aqueous solution containing titanium tetrachloride and having a pH of less than 3 so that acidic functional groups of organic acid/Ti (molar ratio) is 0.001 to 0.037 to precipitate titanium oxide; and a drying treatment step of drying the resulting titanium oxide in an atmosphere with an initial relative humidity of 70% to 100% to powder it.

(11) In the method for producing a titanium oxide powder according (10) above, the organic acid may be an α-hydroxycarboxylic acid.

(12) In the method for producing a titanium oxide powder according to (10) or (11) above, the organic acid or inorganic acid in the aqueous solution may have a molecular weight of 300 or less.

(14) The method for producing a titanium oxide powder according to (6) to (13) above may further include: a purification step of purifying titanium oxide using any one or more of an ultrafiltration membrane, a reverse osmosis membrane, an ion exchange resin, and an electrodialysis membrane.

Advantageous Effects of Invention

According to the present invention, it is possible to provide an anatase-type titanium oxide powder with high specific surface area and high dispersibility and a method for producing the same.

DESCRIPTION OF EMBODIMENTS

Hereinafter, examples of embodiments of the present invention will be described. In the present invention, there is no limitation to only the following examples.

In the present embodiment, the term "titanium oxide" refers to titanium (IV) oxide ($TiO_2$) unless otherwise specified. In addition, the term "Ti concentration" is a concentration obtained by dividing (substance amount of Ti atoms considering all titanium atoms constituting titanium compounds, ions containing titanium, and complexes) by (volume of solution containing Ti).

<1. Titanium Oxide Powder>

A titanium oxide powder of one embodiment of the present invention has a BET specific surface area of 300 $m^2/g$ to 480 $m^2/g$ as measured through a nitrogen adsorption method, an anatase content of a crystalline phase of 90% or more as measured through XRD measurement, and a spin-spin relaxation time T2 of 46 ms to 103 ms obtained by performing pulse nuclear magnetic resonance (NMR) measurement of a 5 mass % suspension prepared using ion exchange water.

(BET Specific Surface Area)

As described above, the BET specific surface area of the titanium oxide powder of one embodiment of the present invention is 300 $m^2/g$ or more. If the BET specific surface area is 300 $m^2/g$ or more, an ultrafine particle material typified by a multilayer ceramic capacitor material of size 0201 can be obtained when titanium oxide is reacted with other substances. From the same viewpoint, the BET specific surface area of the titanium oxide powder is preferably 350 $m^2/g$ or more and more preferably 380 $m^2/g$ from the viewpoint of obtaining an ultrafine particle material with a finer particle diameter.

As described above, the BET specific surface area of the titanium oxide powder of one embodiment of the present invention is 480 $m^2/g$ or less. When the BET specific surface area is 480 $m^2/g$ or less, abnormal grain growth of titanium oxide can be suppressed even when a reaction with barium carbonate is caused at a high temperature, and a particle size distribution of barium titanate which is a resulting material is effectively uniformized. From the same viewpoint, the BET specific surface area of the titanium oxide powder is preferably 430 $m^2/g$ or less and more preferably 400 $m^2/g$ from the viewpoint of obtaining material with a more uniform particle size distribution.

(Anatase Content)

In the titanium oxide powder of the present embodiment, the content of the anatase phase of the crystalline phase as measured through XRD measurement is 90% or more. When titanium oxide is reacted with other substances, a high content of the anatase phase in the titanium oxide powder makes it more reactive and advantageous. From the same viewpoint, the content of the above-described anatase phase is preferably 95% or more and still more preferably 99% or more.

(Spin-Spin Relaxation Time)

Unlike high-resolution NMR, pulsed NMR is a technique that does not provide chemical shift information, but instead allows rapid measurement of relaxation times of 1H nuclei (a spin-lattice relaxation time T1 and a spin-spin relaxation time T2) which are closely related to molecular motility.

Use of pulsed NMR has spread rapidly in recent years, examples of pulsed NMR measurement methods include a Hahn echo method, a solid echo method, a CPMG method, or 90° pulse NMR, and all of them can be suitably used. The spin-spin relaxation time T2 in the present invention means a spin-spin relaxation time T2 of 1H nuclei measured through a CPMG method.

In the titanium oxide of the present embodiment, the spin-spin relaxation time T2 of 1H nuclei measured through a CPMG method of pulsed NMR when the titanium oxide is dispersed in water is thought to be a property related to the state of water molecules bound to the titanium oxide surface. Specifically, the shorter the spin-spin relaxation time T2, the more water molecules are bound to the titanium oxide surface (due to a thicker hydration layer), which is thought to improve the dispersibility of titanium oxide and make it easier to improve filtration performance.

In the titanium oxide powder of one embodiment of the present invention, the spin-spin relaxation time T2 of a 5 mass % suspension prepared using ion exchange water measured through a CPMG method of pulsed NMR is 46 ms to 103 ms. If the spin-spin relaxation time T2 of the above-described suspension is 46 ms or longer, the titanium oxide powder will not become over-dispersed when it is reslurried to prepare a dispersion to obtain barium titanate, and the viscosity will be appropriately controlled to have an excellent fluidity, which is advantageous when reacting with other substances. From the same viewpoint, the spin-spin relaxation time T2 is preferably 60 ms or longer and more preferably 70 ms or longer. It is thought that when the spin-spin relaxation time T2 is 103 ms or shorter, the number of water molecules bound to the titanium oxide surface increases (due to the thick hydration layer), resulting in excellent dispersibility. From the same viewpoint, the spin-spin relaxation time T2 is preferably 90 ms or shorter and more preferably 80 ms or shorter.

(Elemental Analysis)

Incorporation of chlorine (Cl), iron (Fe), aluminum (Al), silicon (Si), and sulfur(S) is thought to cause a decrease in dielectric constant when the titanium oxide powder according to the present embodiment is used as a raw material for dielectric materials. Therefore, each content of chlorine, aluminum, silicon, and sulfur in the titanium oxide powder according to the present embodiment is preferably 0.1 mass % or less, more preferably 0.05 mass % or less, and still more preferably 0.01 mass % or less. There are no particular restrictions on the lower limit values, but from the cost perspective of the production method, 0.0001 mass % or more is preferable.

To suppress precipitation of by-products derived from carbon (C), the content of carbon in the titanium oxide according to one embodiment of the present invention is preferably 0.50 mass % or less, more preferably 0.30 mass % or less, and still more preferably 0.10 mass % or less. There are no particular restrictions on the lower limit value, but from the cost perspective of the production method, 0.001 mass % or more is preferable.

(Half Width of Diffraction Peak in Crystalline X-Ray Diffraction Measurement)

The half width at half maximum (FWHM) of the diffraction peak appearing in a range of diffraction angles $2\theta$ of $24.5°$ to $26.0°$ obtained through X-ray diffraction (XRD) measurement of the titanium oxide powder of the present embodiment is preferably $1.10°$ or more. In this case, a smaller FMHM of the titanium oxide powder is preferable due to its higher crystallinity. However, to make the FMHM very small, the titanium oxide powder must be reacted at a high temperature, which tends to cause aggregation of the titanium oxide powder, resulting in a smaller BET specific surface area. Therefore, from the viewpoint of obtaining a less aggregated titanium oxide powder, it is desirable to set the FMHM to a certain level or higher, preferably $1.10°$ or more. From the same viewpoint, the FWHM is preferably $1.30°$ or more and more preferably $1.50°$ or more.

The above-described FWHM is preferably $2.00°$ or less. This is because the better the crystallinity of titanium oxide, the better the crystallinity of a product produced using titanium oxide. From the same viewpoint, $1.90°$ or less is more preferable, and $1.80°$ or less is still more preferable.

The titanium oxide powder according to one embodiment of the present invention has a zeta potential of −63 mV to −40 mV by having the above-described configuration. In other words, a zeta potential absolute value of the titanium oxide powder according to the present embodiment is 40 mV to 63 mV. In this manner, the titanium oxide powder according to one embodiment of the present invention has high dispersibility due to its large zeta potential, and because the zeta potential is not excessive, it prevents over-dispersion and excessive viscosity of the dispersion when attempting to produce barium titanate, thereby preventing poor fluidity.

<2. Method 1 for Producing Titanium Oxide Powder>

Hereinafter, a method for producing the titanium oxide powder according to the above-described embodiment will be described.

A method for producing a titanium oxide powder according to one aspect of the present invention includes a synthesis step and a drying treatment step. The synthesis process involves mixing an aqueous solution containing any one selected from the group consisting of urea, an ammonia compound, an organic acid, and an inorganic acid with an aqueous solution containing titanium tetrachloride and having a pH of less than 3 to precipitate titanium oxide. In above-described synthesis process, (i) when using an aqueous solution containing urea, mixing is performed so that urea/Ti (molar ratio) is 0.001 to 0.058, (ii) when using an aqueous solution containing an ammonia compound, mixing is performed so that urea/Ti (molar ratio) is 0.001 to 0.029, (iii) when using an aqueous solution containing an inorganic acid, mixing is performed so that inorganic acid/Ti (molar ratio) is 0.001 to 0.030, and (iv) when using an aqueous solution containing an organic acid, mixing is performed so that acidic functional groups of organic acid/Ti (molar ratio) is 0.001 to 0.037. The drying treatment step involves drying the resulting titanium oxide in an atmosphere with an initial relative humidity of 70% to 100% to powder it.

First, a method for producing a titanium oxide powder using urea as an additive to a titanium tetrachloride aqueous solution will be described as a production method 1.

The method for producing a titanium oxide powder according to the present embodiment includes: a synthesis step of mixing an aqueous solution containing urea with an aqueous solution containing titanium tetrachloride and having a pH of less than 3 so that (urea [mol]/Ti [mol]) (molar ratio) is 0.001 to 0.058 to precipitate titanium oxide; and a drying treatment step of drying the resulting titanium oxide in an atmosphere with an initial relative humidity of 70% to 100% to powder it.

<2-1. Synthesis Step>

As described above, first, an aqueous solution containing urea is mixed with an aqueous solution containing titanium tetrachloride to obtain an aqueous solution. Hereinafter, the aqueous solution obtained by mixing may be referred to as a mixed solution. During the synthesis step, hydrolysis of titanium tetrachloride progresses. The aqueous solution containing titanium tetrachloride has a pH value of less than 3. This is to allow the hydrolysis reaction to proceed preferentially. In addition, the aqueous solution containing titanium tetrachloride preferably has a pH of 2 or less, more preferably a pH of 1 or less, and for example, 0.1 or more.

Urea acts as a reaction inhibitor. By adding urea, formation of titanium oxide particles becomes milder, and the suppression of phase transition to rutile phases and aggregation can be achieved.

The aqueous solution containing urea preferably has a pH of less than 12.0. This is because, at a pH below 12.0, the hydrolysis reaction occurs rapidly, making it difficult to generate heterogeneous phases containing brookite phases, and titanium oxide gradually precipitates and is likely to disperse. From the same viewpoint, the pH is preferably 11.5 or less and more preferably 11.0 or less. In addition, the pH is preferably greater than 10, that is, the pH is preferably a value exceeding 10. This is to sufficiently suppress the rate of the hydrolysis reaction and to suppress the phase transition to stable rutile phases.

It is preferable that the concentration of Ti atoms in the aqueous solution (mixed solution) obtained by mixing the aqueous solution containing urea and the aqueous solution containing titanium tetrachloride be 0.01 mol/L or more. This is to allow the hydrolysis reaction to proceed preferentially. From the same viewpoint, 0.03 mol/L or more is more preferable, and 0.05 mol/L or more is still more preferable.

The concentration of Ti atoms in the mixed solution is preferably 1.00 mol/L or less. This is to prevent precipitation of stable rutile phases by suppressing the Ti concentration. From the same viewpoint, 0.50 mol/L or less is more preferable, and 0.20 mol/L or less is still more preferable.

Regarding the urea content in the mixed solution, the ratio of the substance amount of urea to the substance amount of Ti in the mixed solution (urea [mol]/Ti [mol]) is 0.001 or more. This is to sufficiently suppress the rate of the hydrolysis reaction and to suppress the phase transition to stable rutile phases. From the viewpoint of further suppressing the phase transition to rutile phases, the above-described ratio (urea [mol]/Ti [mol]) is preferably 0.013 or more and more preferably 0.030 or more. The above-described ratio (urea [mol]/Ti [mol]) is 0.058 or less, preferably 0.050 or less. This is to prevent the hydrolysis reaction from being excessively suppressed.

The mixed solution is preferably heated to precipitate titanium oxide. It is preferable from the viewpoint of productivity to heat the mixed solution at a high heating rate. On the other hand, to suppress precipitation of amorphous titanium oxide and improve crystallinity, it is preferable to suppress the rapid progress of the reaction and control the heating rate to allow sufficient crystal growth. Therefore, the heating of the mixed solution to a target temperature, that is, a synthesis temperature is preferably performed at a heating rate of 0.1° C./min to 1.5° C./min, more preferably performed at a heating rate of 0.3° C./min to 1.0° C./min, and still more preferably performed at a heating rate of 0.6° C./min to 1.0° C./min.

The synthesis temperature is preferably 50° C. or higher and more preferably 60° C. or higher. This is to allow the hydrolysis reaction to proceed preferentially. The synthesis temperature is preferably 100° C. or lower. This is to suppress the phase transition to stable rutile phases.

The holding time at the synthesis temperature of the mixed solution can be set arbitrarily, and the temperature may be lowered without being held, or may be held for a predetermined time. The holding time at the synthesis temperature of the mixed solution is 15 minutes or more from the viewpoint of sufficiently progressing the reaction. After terminating the reaction, it is preferable to allow the temperature to cool and lower to room temperature.

<2-2. Purification Step>

The method for producing a titanium oxide powder according to one embodiment of the present invention preferably includes a purification step of purifying titanium oxide. In the purification step, any one or more of the group consisting of an ultrafiltration membrane, a reverse osmosis membrane, an ion exchange resin, and an electrodialysis membrane is used, for example. Because the method for producing a titanium oxide powder according to one embodiment of the present invention further includes the purification step, it is possible to remove chlorine (Cl), sulfur(S), silicon (Si), iron (Fe), aluminum (Al), and the like in a slurry containing titanium oxide obtained through the synthesis step.

The purification step is a step performed after the synthesis step. Since the purification step is performed while dispersing titanium oxide in a liquid, it is desirably performed before the drying treatment step.

<2-3. Dehydration Step>

The method for producing a titanium oxide powder according to one embodiment of the present invention may further include a dehydration step of dehydrating a slurry using a filter press or the like to obtain a solid content. The dehydration step is performed before the drying treatment step and after the synthesis step, for example. If the method for producing a titanium oxide powder includes a purification step, the dehydration step is performed after the purification step. Dehydration allows the drying treatment step to be performed efficiently.

<2-4. Drying Treatment Step>

The method for producing a titanium oxide powder according to one embodiment of the present invention includes a drying treatment step (drying step) of drying the resulting titanium oxide in an atmosphere with an initial relative humidity of 70% to 100% to powder it. The initial relative humidity is relative humidity at the start of the drying treatment step.

The dry atmosphere may be atmospheric or in an inert gas atmosphere.

Titanium oxide may be dried in a slurry state dispersed or dissolved in water, or may be dried in a dehydrated state using a filter press or the like.

In the drying treatment step, drying is performed in an atmosphere with an initial relative humidity of 70% to 100% to remove moisture while suppressing deactivation of hydroxyl groups on the titanium oxide surface. From the same viewpoint, a humidity of 75% or more is preferable, a humidity of 80% or more is more preferable, and a humidity of 90% or more is even more preferable. In addition, the initial relative humidity in the drying treatment step may be 99% or less or 97% or less. After drying in an atmosphere with an initial relative humidity of 70% or more for a certain period of time, it is preferable to perform drying in the atmosphere after a certain period of time to promote drying. The processing of maintaining an initial relative humidity of 70% or more is also called aging treatment. The aging treatment time is preferably 3 to 48 hours, more preferably 5 to 30 hours.

In the drying treatment step, for example, drying is performed until the moisture content of the obtained sample becomes 2 mass % to 15 mass %, and solid titanium oxide is obtained. By pulverizing the resulting oxide solids with a mortar or the like, a titanium oxide powder can be obtained.

<3. Method 2 for Producing Titanium Oxide Powder>

Next, a method for producing a titanium oxide powder using an ammonium compound as an additive to a titanium tetrachloride aqueous solution will be described as a production method 2.

The method for producing a titanium oxide powder (production method 2) of another aspect of the production method 1 according to one embodiment of the present invention includes: a synthesis step of mixing an aqueous solution containing an ammonium compound with an aqueous solution containing titanium tetrachloride and having a pH of less than 3 so that (ammonium compound [mol]/Ti [mol]) (molar ratio) is 0.001 to 0.029 to precipitate titanium oxide; and a drying treatment step of drying the resulting titanium oxide in an atmosphere with an initial relative humidity of 70% to 100% to powder it. The initial relative humidity in the drying treatment step is preferably 70% or more. The method for producing a titanium oxide powder of the present aspect differs from the method for producing a titanium oxide powder of the above-described aspect (production method 1) in the conditions for the synthesis step.

In the method for producing a titanium oxide powder of the present aspect, steps other than the synthesis step can be performed in the same manner as the method for producing a titanium oxide powder of the above-described aspect. In other words, in the production method 2, one or both of the purification step and the dehydration treatment step may be performed between the synthesis step and the drying treatment step. In addition, the preferred conditions for the purification step, dehydration step, and the drying treatment step can be set to be the same as those in the production method 1. Hereinafter, the conditions for the synthesis step in the method for producing a titanium powder of the present aspect which differ from those in the production method 1 will be described.

The ammonium compound acts as a reaction inhibitor. By adding this, formation of titanium oxide particles becomes milder, and the suppression of phase transition to rutile phases and aggregation can be achieved. The ammonium compound is preferably ammonia, ammonium chloride, and ammonium carbonate, and among these, ammonium carbonate is particularly preferable. Ammonium carbonate is likely to be adjusted to a desired pH and enables production of a titanium oxide powder under ideal conditions.

Regarding the content of the ammonium compound in the aqueous solution (mixed solution) in which the aqueous solution containing an ammonium compound is mixed with the aqueous solution containing titanium tetrachloride and having a pH of less than 3, the ratio of the substance amount of the ammonium compound to the substance amount of Ti (ammonium compound [mol]/Ti [mol]) in the mixed solution is preferably 0.001 or more. This is to sufficiently suppress the rate of the hydrolysis reaction and to suppress the phase transition to stable rutile phases. From the viewpoint of further suppressing the phase transition to rutile phases, the above-described substance amount ratio is more preferably 0.005 or more and still more preferably 0.013 or more. The above-described substance amount ratio (ammonium compound [mol]/Ti [mol]) is preferably 0.029 or less. This is to prevent the hydrolysis reaction from being excessively suppressed. From the same viewpoint, 0.020 or less is still more preferable.

<4. Method 3 for Producing Titanium Oxide Powder>

Next, a method for producing a titanium oxide powder using an aqueous solution containing an inorganic acid as an additive to a titanium tetrachloride aqueous solution will be described as a production method 3.

The method for producing a titanium oxide powder according to one embodiment of the present invention different from the production methods 1 and 2 includes: a synthesis step of mixing an aqueous solution containing an inorganic acid with an aqueous solution containing titanium tetrachloride and having a pH of less than 3 so that (inorganic acid [mol]/Ti [mol]) (molar ratio) is 0.001 to 0.030 to precipitate titanium oxide; and a drying treatment step of drying the resulting titanium oxide in an atmosphere with an initial relative humidity of 70% to 100% to powder it. The initial relative humidity in the drying treatment step is preferably 70% or more, more preferably 75% or more, and still more preferably 80% or more. The method for producing a titanium oxide powder of the present aspect differs from the method for producing a titanium oxide powder of the above-described aspect (production method 1) in the conditions for the synthesis step. In the method for producing a titanium oxide powder of the present aspect, steps other than the synthesis step can be performed in the same manner as the method for producing a titanium oxide powder of the above-described aspect. In other words, in the production method 3, one or both of the purification step and the dehydration treatment step may be performed between the synthesis step and the drying treatment step. In addition, the preferred conditions for the purification step, dehydration step, and the drying treatment step can be set to be the same as those in the production method 1. Hereinafter, the conditions for the synthesis step in the method for producing a titanium oxide powder of the present aspect which differ from those in the production method 1 will be described.

<4-1. Synthesis Step>

The aqueous solution containing titanium tetrachloride has a pH of less than 3. This is to allow the hydrolysis reaction to proceed preferentially. In addition, the pH is more preferably 2 or less and still more preferably 1 or less.

Inorganic acids stabilize the surface of produced titanium oxide particles by adhering to the particles and act as phase transition inhibitors that suppress phase transition from anatase phases to rutile phases. Inorganic acids modify the surface of titanium oxide. In addition, they also have an effect of suppressing aggregation of particles. Inorganic acids are preferably strong inorganic acids, and sulfuric acid (molecular weight 98.08) is preferable from the viewpoint of suppressing the phase transition to rutile phases.

The molecular weight of an inorganic acid is preferably 300 or less. When an inorganic acid with an excessively high molecular weight is added, the molecules of the inorganic acid are too long for precipitated titanium oxide, making it difficult to uniformly modify the titanium oxide surface, and the particles may not disperse sufficiently. In such cases, there is a concern that the particles will rather aggregate, and the phase transition to rutile phases will proceed from the aggregation surface. By setting the molecular weight of the inorganic acid to 300 or less, the inorganic acid can uniformly modify the titanium oxide surface, thereby enhancing the dispersibility of the particles. From the same viewpoint, the molecular weight of the inorganic acid is preferably 250 or less and more preferably 200 or less. In addition, the molecular weight of the inorganic acid is, for example, 30 or more.

The Ti concentration in the mixed solution obtained by mixing the aqueous solution containing an inorganic acid with the aqueous solution containing titanium tetrachloride and having a pH of less than 3 is preferably 0.01 mol/L. This is to allow the hydrolysis reaction to proceed preferentially. From the same viewpoint, 0.05 mol/L or more is more preferable, and 0.30 mol/L or more is still more preferable.

The Ti concentration in the mixed solution is preferably 2.00 mol/L or less. This is to suppress the phase transition to rutile phases. From the same viewpoint, 1.50 mol/L or less is more preferable, and 1.00 mol/L or less is still more preferable.

Regarding the content of an acidic compound in the mixed solution of the aqueous solution containing an inorganic acid and the aqueous solution containing titanium tetrachloride and having a pH of less than 3, the ratio of the substance amount of the inorganic acid to the substance amount of titanium (inorganic acid [mol]/Ti [mol]) (molar ratio) is 0.001 to 0.037. This is to suppress the phase transition from anatase phases to rutile phases. From the same viewpoint, 0.010 or more is preferable, and 0.015 or more is still more preferable. The above-described substance amount ratio (inorganic acid [mol]/Ti [mol]) is preferably 0.030 or less. This is because adding an excessive amount of inorganic acid is likely to inhibit the reaction.

<5. Method 4 for Producing Titanium Oxide Powder>

Next, a method for producing a titanium oxide powder using an aqueous solution containing an organic acid as an additive to a titanium tetrachloride aqueous solution will be described as a production method 4.

The method for producing a titanium oxide powder of the present aspect differs from the method for producing a titanium oxide powder of the above-described aspect (production method 1) in the conditions for the synthesis step. In the method for producing a titanium oxide powder of the present aspect, steps other than the synthesis step can be performed in the same manner as the method for producing a titanium oxide powder of the above-described aspect. In other words, in the production method 3, one or both of the purification step and the dehydration treatment step may be performed between the synthesis step and the drying treatment step. In addition, the preferred conditions for the purification step, dehydration step, and the drying treatment step can be set to be the same as those in the production method 1. Hereinafter, the conditions for the synthesis step in the method for producing a titanium oxide powder of the present aspect which differ from those in the production method 1 will be described.

The method for producing a titanium oxide powder according to one embodiment of the present invention different from the production methods 1 to 3 includes: a synthesis step of mixing an aqueous solution containing an organic acid with an aqueous solution containing titanium tetrachloride and having a pH of less than 3 so that (acidic functional groups of organic acid [mol]/Ti [mol]) (molar ratio) is 0.001 to 0.037 to precipitate titanium oxide; and a drying treatment step of drying the resulting titanium oxide in an atmosphere with an initial relative humidity of 70% to 100% to powder it. The initial relative humidity in the drying treatment step is preferably 70% or more, more preferably 75% or more, and still more preferably 80% or more.

<5-1. Synthesis Step>

The aqueous solution containing titanium tetrachloride has a pH of less than 3. This is to allow the hydrolysis reaction to proceed preferentially. In addition, the pH is more preferably 2 or less and still more preferably 1 or less.

Organic acids stabilize the surface of produced titanium oxide particles by adhering to the particles and act as phase transition inhibitors that suppress phase transition from anatase phases to rutile phases. In addition, they also have an effect of suppressing aggregation of particles. Organic acids are preferably a-hydroxycarboxylic acids, and malic acid (molecular weight 134.09) and citric acid (192.12) are more preferable from the viewpoint of suppressing the phase transition to rutile phases.

The molecular weight of an organic acid is preferably 300 or less for the same reason as inorganic acids. In other words, when an organic acid with an excessively high molecular weight is added, molecules of the acidic compound are long and large for precipitated titanium oxide particles, making it difficult to uniformly modify the titanium oxide surface, and the particles may not disperse sufficiently. In such cases, the particles rather aggregate, and the phase transition to rutile phases proceeds from the aggregation surface. By setting the molecular weight of the organic acid to 300 or less, the organic acid can uniformly modify the titanium oxide surface, thereby enhancing the dispersibility of the particles. From the same viewpoint, the molecular weight of the acidic compound is preferably 250 or less, and more preferably 200 or less. In addition, the molecular weight of the organic acid is, for example, 30 or more, preferably 40 or more.

The Ti concentration in the mixed solution of the aqueous solution containing an organic acid and the aqueous solution containing titanium tetrachloride and having a pH of less than 3 is preferably 0.01 mol/L or more. This is to allow the hydrolysis reaction to proceed preferentially. From the same viewpoint, 0.05 mol/L or more is more preferable, and 0.30 mol/L or more is still more preferable.

The Ti concentration is preferably 2.00 mol/L or less. This is to suppress the phase transition to rutile phases. From the same viewpoint, 1.50 mol/L or less is more preferable, and 1.00 mol/L or less is still more preferable.

Regarding the content of the acidic functional groups of the organic acid in the mixed solution of the aqueous solution containing an organic acid and the aqueous solution containing titanium tetrachloride and having a pH of less than 3, the ratio of the substance amount of the acidic functional groups of the organic acid to the substance amount of Ti in the mixed solution (acidic functional groups of organic acid [mol]/Ti [mol]) (molar ratio) is preferably 0.001 to 0.037. This is to suppress the phase transition from anatase phases to rutile phases. From the same viewpoint, 0.010 or more is preferable, and 0.015 or more is still more preferable. The above-described substance amount ratio (substance amount of acidic functional groups of organic acid [mol]/Ti [mol]) is preferably 0.037 or less. This is because adding an excessive amount of organic acid is likely to inhibit the reaction. From the same viewpoint, 0.030 or less is still more preferable.

Here, the substance amount of the acidic functional groups of the organic acid in the mixed solution represents the sum of substance amount of acidic functional groups of an organic acid contained in a mixed solution. For example, if the organic acid contained in the mixed solution is only 1 [mol] of citric acid, since citric acid has three acidic functional groups, the substance amount of the acidic functional groups of the organic acid in the mixed solution is 3 [mol].

According to the above-described embodiment, it is possible to an anatase-type titanium oxide powder with high specific surface area and high affinity with a solvent by synthesizing anatase-type titanium oxide through hydrolysis of titanium tetrachloride in the presence of dispersants such as urea, an ammonium compound, an inorganic acid, and an organic acid and drying the synthesized titanium oxide in an atmosphere with an initial relative humidity of 70% to 100%, dense aggregation and particle growth between particles can be suppressed, and by obtaining a dry powder without inactivating hydroxyl groups on the surface of the particles.

EXAMPLES

Hereinafter, examples and comparative examples of the present invention will be described, but do not limit the technical scope of the present invention.

Example 1

A mixed solution was obtained which had been adjusted such that the Ti molar concentration was 0.096 mol/L and (substance amount of urea [mol]/substance amount of Ti [mol]) was 0.026 by adding a urea aqueous solution adjusted to a pH of 11 with ammonia water to a titanium tetrachloride aqueous solution (pH: 0.8) with a Ti concentration of 15 mass % (titanium tetrachloride concentration of 59 mass %) maintained at 20° C. The liquid temperature in this adjustment step was constantly maintained at 20° C.

Next, the mixed solution was transferred to a glass reactor.

Next, the temperature was raised to 60° C. at a temperature increase rate of 0.4° C./min using an external heater while stirring the mixed solution at 60 rpm using a stirrer, and maintained for 30 minutes.

Thereafter, the reaction solution was cooled to room temperature (25° C.), and a slurry was obtained.

The cooled slurry was neutralized with ammonia water, filtered and recovered using an ultrafiltration membrane ("Microza UF" (registered trademark" manufactured by Asahi Kasei Corporation), and washed with ion exchange water.

The washed slurry was dehydrated to a 30 mass % solid using a filter press.

The titanium oxide solid matter obtained through dehydration was placed in a container set to an air atmosphere with an initial relative humidity of 80% and aged for 24 hours. Then, it was dried in the atmosphere until the moisture content reached 10 mass % to obtain a titanium oxide solid. This solid was pulverized in a mortar to obtain a titanium oxide powder.

Example 2

A titanium oxide powder was obtained under the same conditions as in Example 1 except that the Ti molar concentration in the mixed solution was not changed and the conditions of the adjustment step were changed so that (substance amount of urea [mol]/substance amount of Ti [mol]) was 0.042.

Example 3

A titanium oxide powder was obtained under the same conditions as in Example 1 except that the Ti molar concentration in the mixed solution was not changed and the conditions of the adjustment step were changed so that (substance amount of urea [mol]/substance amount of Ti [mol]) was 0.053.

Example 4

A mixed solution was obtained which had been adjusted such that the Ti molar concentration was 0.096 mol/L and (substance amount of ammonium compound [mol]/substance amount of Ti [mol]) was 0.010 by adding an ammonium carbonate aqueous solution adjusted to a pH of 11 to a titanium tetrachloride aqueous solution (pH: 0.8) with a Ti concentration of 15 mass % (titanium tetrachloride concentration of 59 mass %) maintained at 20° C. The liquid temperature in this adjustment step was constantly maintained at 20° C.

Next, the mixed solution was transferred to a glass reactor.

Next, the temperature was raised to 60° C. at a temperature increase rate of 0.4° C./min using an external heater while stirring the mixed solution at 60 rpm using a stirrer, and maintained for 30 minutes. Thereafter, the reaction solution was cooled to room temperature (25° C.), and a slurry was obtained.

Next, the cooled slurry was neutralized with ammonia water, filtered and recovered using an ultrafiltration membrane ("Microza UF" (registered trademark" manufactured by Asahi Kasei Corporation), and washed with ion exchange water.

The washed slurry was dehydrated to a 30 mass % solid using a filter press.

The titanium oxide solid matter obtained through dehydration was placed in a container set to an air atmosphere with an initial relative humidity of 80% and aged for 24 hours. Then, it was dried in the atmosphere until the moisture content reached 10 mass % to obtain a titanium oxide solid. This solid was pulverized in a mortar to obtain a titanium oxide powder.

Example 5

A titanium oxide powder was obtained under the same conditions as in Example 4 except that the Ti molar concentration in the mixed solution was not changed and the conditions of the adjustment step were changed so that (substance amount of ammonium compound [mol]/substance amount of Ti [mol]) was 0.016.

Example 6

A mixed solution was obtained which had been adjusted such that the Ti molar concentration was 0.074 mol/L and (substance amount of inorganic acid [mol]/substance amount of Ti [mol]) was 0.026 by adding a sulfuric acid aqueous solution to a titanium tetrachloride aqueous solution (pH: 0.7) with a Ti concentration of 15 mass % (titanium tetrachloride concentration of 59 mass %) maintained at 20° C. The liquid temperature in this adjustment step was constantly maintained at 20° C.

Next, the mixed solution was transferred to a glass reactor.

Next, the temperature was raised to 80° C. at a temperature increase rate of 0.2° C./min using an external heater while stirring the mixed solution at 60 rpm using a stirrer, and maintained for 30 minutes. Thereafter, the reaction solution was cooled to room temperature (25° C.), and a slurry was obtained.

Next, the cooled slurry was neutralized with ammonia water, filtered and recovered using an ultrafiltration membrane ("Microza UF" (registered trademark" manufactured by Asahi Kasei Corporation), and washed with ion exchange water.

Next, the washed slurry was dehydrated to a 30 mass % solid using a filter press.

Next, the titanium oxide solid matter obtained through dehydration was placed in a container set to an air atmosphere with an initial relative humidity of 80% and aged for 24 hours. Then, it was dried in the atmosphere until the moisture content reached 10 mass % to obtain a titanium oxide solid. This solid was pulverized in a mortar to obtain a titanium oxide powder.

Example 7

A titanium oxide powder was obtained under the same conditions as in Example 6 except that the Ti molar concentration in the mixed solution was not changed and the conditions of the adjustment step were changed so that (substance amount of inorganic acid [mol]/substance amount of Ti [mol]) was 0.027.

Example 8

A titanium oxide powder was obtained under the same conditions as in Example 6 except that the Ti molar concentration in the mixed solution was not changed and the conditions of the adjustment step were changed so that (substance amount of inorganic acid [mol]/substance amount of Ti [mol]) was 0.029.

Example 9

A titanium oxide powder was obtained through the same method as in Example 6 except that, in the adjustment step, a citric acid aqueous solution was used instead of sulfuric acid, the mixed solution was adjusted such that the Ti molar concentration was 0.074 mol/L and (substance amount of acidic functional groups of organic acid [mol]/substance amount of Ti [mol]) was 0.022, and the initial relative humidity of the container when the titanium oxide solid matter obtained through dehydration was dried to obtain a titanium oxide solid was changed to 95%.

Example 10

A titanium oxide powder was obtained under the same conditions as in Example 9 except that the Ti molar concentration in the mixed solution was not changed and the conditions of the adjustment step were changed so that (substance amount of acidic functional groups of organic acid [mol]/substance amount of Ti [mol]) was 0.034.

Example 11

A titanium oxide powder was obtained through the same method as in Example 9 except that, in the adjustment step, malic acid was used instead of citric acid and the mixed solution was adjusted such that the Ti molar concentration was 0.074 mol/L and (substance amount of acidic functional groups of organic acid [mol]/substance amount of Ti [mol]) was 0.026.

Example 12

A titanium oxide powder was obtained under the same conditions as in Example 11 except that the Ti molar concentration in the mixed solution was not changed and the conditions of the adjustment step were changed so that (substance amount of acidic functional groups of organic acid [mol]/substance amount of Ti [mol]) was 0.036.

Comparative Example 1

A titanium oxide powder was obtained through the same method as in Example 1 except that, in the adjustment step, a titanium tetrachloride aqueous solution with a Ti concentration of 15 mass % (titanium tetrachloride concentration of 59 mass %) (Ti molar concentration of 0.096 mol/L) was used instead of the mixed solution without using the urea aqueous solution.

Comparative Example 2

A titanium oxide powder was obtained under the same conditions as in Example 1 except that the Ti molar concentration in the mixed solution was not changed and the conditions of the adjustment step were changed so that (substance amount of urea [mol]/substance amount of Ti [mol]) was 0.063.

Comparative Example 3

A titanium oxide powder was obtained under the same conditions as in Example 4 except that the pH of the titanium tetrachloride aqueous solution used for mixing was changed to 0.9, the Ti molar concentration in the mixed solution was not changed, and the conditions of the adjustment step were changed so that (substance amount of ammonium compound [mol]/substance amount of Ti [mol]) was 0.033.

Comparative Example 4

A titanium oxide powder was obtained through the same method as in Example 6 except that, in the adjustment step, a titanium tetrachloride aqueous solution with a Ti concentration of 15 mass % (titanium tetrachloride concentration of 59%) (Ti molar concentration of 0.074 mol/L) was used instead of the mixed solution without using the urea aqueous solution and the initial relative humidity of the container when the titanium oxide solid matter obtained through dehydration was wet-dried to obtain a titanium oxide solid was changed to 80%.

Comparative Example 5

A titanium oxide powder was obtained under the same conditions as in Example 6 except that the initial relative humidity of the container when the titanium oxide solid matter obtained through dehydration was dried to obtain a titanium oxide solid was changed to 0%. In other words, in Comparative Example 5, the titanium oxide solid matter obtained through dehydration was dry-dried.

Comparative Example 6

A titanium oxide powder was obtained under the same conditions as in Example 6 except that the initial relative humidity of the container when the titanium oxide solid matter obtained through dehydration was wet-dried to obtain a titanium oxide solid was changed to 30%.

Comparative Example 7

A titanium oxide powder was obtained under the same conditions as in Example 6 except that the Ti molar concentration in the mixed solution was not changed, the conditions of the adjustment step were changed so that (substance amount of inorganic acid [mol]/substance amount of Ti [mol]) was 0.031, and the initial relative humidity of the container when the titanium oxide solid matter obtained through dehydration was wet-dried to obtain a titanium oxide solid was changed to 80%.

Comparative Example 8

A titanium oxide powder was obtained through the same method as in Example 9 except that, in the adjustment step, a titanium tetrachloride aqueous solution with a Ti concentration of 15 mass % (titanium tetrachloride concentration of 59%) (Ti molar concentration of 0.096 mol/L) was used instead of the mixed solution without using the citric acid aqueous solution.

Comparative Example 9

A titanium oxide powder was obtained under the same conditions as in Example 9 except that the initial relative humidity of the container when the titanium oxide solid matter obtained through dehydration was dried to obtain a titanium oxide solid was changed to 0%.

Comparative Example 10

A titanium oxide powder was obtained under the same conditions as in Example 9 except that the initial relative humidity of the container when the titanium oxide solid matter obtained through dehydration was dried to obtain a titanium oxide solid was changed to 30%.

Comparative Example 11

A titanium oxide powder was obtained under the same conditions as in Example 9 except that the Ti molar concentration in the mixed solution was not changed and the conditions of the adjustment step were changed so that (substance amount of acidic functional groups of organic acid [mol]/substance amount of Ti [mol]) was 0.038.

Comparative Example 12

A titanium oxide powder was obtained under the same conditions as in Example 11 except that the initial relative humidity of the container when the titanium oxide solid matter obtained through dehydration was dried to obtain a titanium oxide solid was changed to 0%.

Comparative Example 13

A titanium oxide powder was obtained under the same conditions as in Example 11 except that the initial relative humidity of the container when the titanium oxide solid matter obtained through dehydration was dried to obtain a titanium oxide solid was changed to 30%.

Comparative Example 14

A titanium oxide powder was obtained under the same conditions as in Example 11 except that the Ti molar concentration in the mixed solution was not changed and the conditions of the adjustment step were changed so that (substance amount of acidic functional groups of organic acid [mol]/substance amount of Ti [mol]) was 0.045.

The production conditions of the titanium oxide powders in Examples 1 to 12 and Comparative Examples 1 to 14 described above are summarized in Table 1. In Table 1, in the comparative examples where the type of additive is represented by "-," no additive was used, and a titanium tetrachloride aqueous solution was used instead of the mixed solution. For the sake of explanation, Comparative Example 1 which is the same experimental data is described in a plurality of places. The same applies to Comparative Example 7.

TABLE 1

| | | | | Synthesis step | | | | | Drying step |
|---|---|---|---|---|---|---|---|---|---|
| | Type of additive | Ti Concentration [mol/L] | Additive/Ti Molar ratio | Acidic functional group/Ti Molar ratio | pH of Titanium tetrachloride aqueous solution before mixing | Temperature increase rate [C./min] | Synthesis temperature [° C.] | Holding time [min] | Initial relative humidity [%] |
| Comparative Example 1 | — | 0.096 | 0.000 | — | 0.8 | 0.4 | 60 | 30 | 80 |
| Example 1 | Urea | 0.096 | 0.026 | — | 0.8 | 0.4 | 60 | 30 | 80 |
| Example 2 | Urea | 0.096 | 0.042 | — | 0.8 | 0.4 | 60 | 30 | 80 |
| Example 3 | Urea | 0.096 | 0.053 | — | 0.8 | 0.4 | 60 | 30 | 80 |
| Comparative Example 2 | Urea | 0.096 | 0.063 | — | 0.8 | 0.4 | 60 | 30 | 80 |
| Example 4 | Ammonium carbonate | 0.096 | 0.010 | — | 0.8 | 0.4 | 60 | 30 | 80 |
| Example 5 | Ammonium carbonate | 0.096 | 0.016 | — | 0.8 | 0.4 | 60 | 30 | 80 |
| Comparative Example 3 | Ammonium carbonate | 0.096 | 0.033 | — | 0.9 | 0.4 | 60 | 30 | 80 |
| Comparative Example 4 | — | 0.74 | 0.000 | — | 0.7 | 0.2 | 80 | 30 | 80 |
| Comparative Example 5 | Sulfuric acid | 0.74 | 0.027 | — | 0.7 | 0.2 | 80 | 30 | 0 |
| Comparative Example 6 | Sulfuric acid | 0.74 | 0.027 | — | 0.7 | 0.2 | 80 | 30 | 30 |
| Example 6 | Sulfuric acid | 0.74 | 0.026 | — | 0.7 | 0.2 | 80 | 30 | 80 |
| Example 7 | Sulfuric acid | 0.74 | 0.027 | — | 0.7 | 0.2 | 80 | 30 | 80 |
| Example 8 | Sulfuric acid | 0.74 | 0.029 | — | 0.7 | 0.2 | 80 | 30 | 80 |
| Comparative Example 7 | Sulfuric acid | 0.74 | 0.031 | — | 0.7 | 0.2 | 80 | 30 | 80 |
| Comparative Example 8 | — | 0.74 | 0.000 | 0.000 | 0.7 | 0.6 | 95 | 0 | 95 |
| Comparative Example 9 | Citric acid | 0.74 | 0.007 | 0.022 | 0.7 | 0.6 | 95 | 0 | 0 |
| Comparative Example 10 | Citric acid | 0.74 | 0.007 | 0.022 | 0.7 | 0.6 | 95 | 0 | 30 |
| Example 9 | Citric acid | 0.74 | 0.007 | 0.022 | 0.7 | 0.6 | 95 | 0 | 95 |
| Example 10 | Citric acid | 0.74 | 0.011 | 0.034 | 0.7 | 0.6 | 95 | 0 | 95 |
| Comparative Example 11 | Citric acid | 0.74 | 0.013 | 0.038 | 0.7 | 0.6 | 95 | 0 | 95 |
| Comparative Example 12 | Malic acid | 0.74 | 0.013 | 0.026 | 0.7 | 0.6 | 95 | 0 | 0 |
| Comparative Example 13 | Malic acid | 0.74 | 0.013 | 0.026 | 0.7 | 0.6 | 95 | 0 | 30 |

TABLE 1-continued

| | Synthesis step | | | | | | | Drying step |
|---|---|---|---|---|---|---|---|---|
| | Type of additive | Ti Concentration [mol/L] | Additive/Ti Molar ratio | Acidic functional group/Ti Molar ratio | pH of Titanium tetrachloride aqueous solution before mixing | Temperature increase rate [C./min] | Synthesis temperature [° C.] | Holding time [min] | Initial relative humidity [%] |
| Example 11 | Malic acid | 0.74 | 0.013 | 0.026 | 0.7 | 0.6 | 95 | 0 | 95 |
| Example 12 | Malic acid | 0.74 | 0.018 | 0.036 | 0.7 | 0.6 | 95 | 0 | 95 |
| Comparative Example 14 | Malic acid | 0.74 | 0.022 | 0.045 | 0.7 | 0.6 | 95 | 0 | 95 |

The titanium oxide powders of Examples 1 to 12 and Comparative Examples 1 to 14 described above were evaluated through the following evaluation methods.

<BET Specific Surface Area>

The specific surface area of a titanium oxide powder was calculated from the nitrogen adsorption-desorption curves through a BET method in accordance with JIS Z8830:2013. The measurement of the specific surface area (BET specific surface area) through the BET method was performed on a sample which had been pretreated by heating to 180° C. and flowing nitrogen gas for 20 minutes, using a QUADRASORV evo manufactured by Quantachrome Instruments. The applicable range of the BET method was set to $P/P_0$ 0.00 to 0.95.

<Anatase Content, Rutile Content>

A titanium oxide powder was subjected to powder X-ray diffraction measurement, and the anatase content was calculated from a peak intensity (Ia) corresponding to an anatase-type crystalline phase, a peak intensity (Ib) corresponding to brookite-type crystalline phase, and a peak intensity (Ir) corresponding to a rutile-type crystalline phase. The anatase content (anatase percentage) of a crystalline phase of the titanium oxide powder was calculated using the following equation.

$$\text{Anatase content [\%]} = \{Ia/(Ia + Ib + Ir)\} \times 100$$

In addition, the rutile content (rutile percentage) of a crystalline phase of a titanium oxide powder was calculated using the following equation.

$$\text{Rutile content [\%]} = \{Ir/(Ia + Ib + Ir)\} \times 100$$

Powder X-ray diffraction measurement was performed using a SmartLab SE manufactured by Rigaku Corporation with a copper target Cu-Kα1 ray under the conditions of a tube voltage of 45 kV, a tube current of 40 mA, a measurement range 2θ of 20 to 35 [deg], a sampling width of 0.0167 [deg], and a scanning speed of 0.0192 [deg/s].

Ia: Intensity of peak corresponding to anatase-type crystalline phase (2θ=24.5° to 26.0°)
Ir: Intensity of peak corresponding to rutile-type crystalline phase (2θ=26.6° to 28.1°)
Ib: Intensity of peak corresponding to brookite-type crystalline phase (2θ=30.8° to 32.3°)

<Half Width of Diffraction Peak in Crystalline X-Ray Diffraction Measurement>

Crystalline X-ray diffraction measurement was performed on a titanium oxide powder using a SmartLab SE manufactured by Rigaku Corporation with a copper target Cu-Kα1 ray under the conditions of a tube voltage of 45 kV, a tube current of 40 mA, a measurement range 2θ of 24.5 to 26.0 [deg], a sampling width of 0.0167 [deg], and a scanning speed of 0.0192 [deg/s], and the FWHM of the main peak of an anatase phase in the vicinity of 2θ=25° was analyzed.

For the analysis, the background was measured with only a glass cell, and the diffraction pattern of a sample was corrected by subtracting the diffraction intensity of the background from the diffraction intensity measured with the sample including titanium oxide and the glass cell.

<Spin-Spin Relaxation Time>

A slurry with 5 mass % titanium oxide was prepared using ion exchange water. A disposable NMR sample tube AS1 NMR manufactured by AS ONE Corporation was filled with this slurry. After filling the sample tube with slurry, pulsed NMR measurement was immediately performed using the Acorn Area manufactured by XiGo Nanotools.

The spin-spin relaxation time T2 of a titanium oxide powder was measured through the pulsed NMR measurement. The measurement was performed under the following conditions.

After a single pulse was emitted at a measurement frequency of 13.1 MHz and a measurement nucleus of 90°, a 180° pulse was emitted at intervals of 0.5 mS, and this scanning was repeated 4 times. Measurement method: CPMG pulse sequence method, sample amount: 0.5 mL, temperature: 23° C., specific surface relaxivity (Ka): 0.0075 g/m$^2$/ms <Elemental Analysis>

After mixing a sample with hydrogen fluoride aqueous solution, the mixture was completely dissolved using a microwave sample pretreatment device ETHOS EASY manufactured by Milestone General K.K., and then Ti, Cl, Si, Al, and Fe in a raw material were measured using atomic absorption spectrometer Z-2300 manufactured by Hitachi, Ltd. The contents of Ti, Cl, Si, Al, and Fe in a titanium oxide powder which is a finished product were also measured using the same device after similarly performing mixing with a hydrogen fluoride aqueous solution and complete dissolving in the aqueous solution.

Carbon and sulfur(S) in the titanium oxide powder were measured using a carbon-sulfur analyzer CS744 (manufactured by LECO Japan Corporation).

<Moisture Content Measurement>

Using a heat-drying type moisture meter MX50 manufactured by A&D Company, Limited, the temperature of 2 g of a titanium oxide powder was raised to 200° C., then infrared heating was performed at 120° C. until the weight change was 0.01 mass % or less, and the moisture content of the titanium oxide powder was measured.

<Zeta Potential Measurement>

A slurry with 0.1 mass % titanium oxide was prepared using ion exchange water. A sapphire cell was filled with this slurry, and the zeta potential of the slurry was measured using ELZ-2000 manufactured by Otsuka Electronics Co., Ltd.

TABLE 2

| | BET Specific surface area [m²/g] | Anatase percentage [%] | Rutile percentage [%] | Spin-spin relaxation time T2 [ms] | FWHM [°] | Content Cl [mass %] | Content Fe [mass %] | Content Al [mass %] | Content Si [mass %] | Content S [mass %] | Content C [mass %] | Zeta potential [mV] | Zeta potential absolute value [mV] |
|---|---|---|---|---|---|---|---|---|---|---|---|---|---|
| Comparative Example 1 | 319 | 98 | 2 | 106 | 1.86 | 0.003 | <0.002 | <0.005 | 0.005 | 0.002 | <0.01 | −39 | 39 |
| Example 1 | 320 | 100 | 0 | 91 | 1.91 | 0.003 | <0.002 | <0.005 | 0.004 | 0.002 | 0.02 | −45 | 45 |
| Example 2 | 353 | 100 | 0 | 85 | 1.94 | 0.003 | <0.002 | <0.005 | 0.004 | 0.001 | 0.03 | −50 | 50 |
| Example 3 | 337 | 100 | 0 | 91 | 1.91 | 0.005 | <0.002 | <0.005 | 0.004 | 0.001 | 0.03 | −43 | 43 |
| Comparative Example 2 | 322 | 100 | 0 | 118 | 1.91 | 0.003 | <0.002 | <0.005 | 0.004 | 0.001 | 0.04 | −35 | 35 |
| Example 4 | 341 | 100 | 0 | 85 | 1.91 | 0.004 | <0.002 | <0.005 | 0.004 | 0.001 | <0.01 | −48 | 48 |
| Example 5 | 347 | 100 | 0 | 70 | 1.91 | 0.004 | <0.002 | <0.005 | 0.004 | 0.001 | <0.01 | −58 | 58 |
| Comparative Example 3 | 320 | 100 | 0 | 149 | 1.96 | 0.005 | <0.002 | <0.005 | 0.007 | 0.002 | <0.01 | −27 | 27 |
| Comparative Example 4 | 291 | 80 | 0 | 187 | 1.82 | 0.006 | <0.002 | <0.005 | 0.004 | 0.001 | <0.01 | −21 | 21 |
| Comparative Example 5 | 424 | 100 | 0 | 175 | 1.68 | 0.002 | <0.002 | <0.005 | 0.003 | 0.023 | <0.01 | −23 | 23 |
| Comparative Example 6 | 322 | 100 | 0 | 148 | 1.41 | 0.002 | <0.002 | <0.005 | 0.002 | 0.02 | <0.01 | −28 | 28 |
| Example 6 | 335 | 100 | 0 | 99 | 1.40 | 0.002 | <0.002 | <0.005 | 0.003 | 0.024 | <0.01 | −42 | 42 |
| Example 7 | 344 | 100 | 0 | 79 | 1.43 | 0.002 | <0.002 | <0.005 | 0.003 | 0.023 | <0.01 | −52 | 52 |
| Example 8 | 350 | 100 | 0 | 65 | 1.48 | 0.002 | <0.002 | <0.005 | 0.003 | 0.025 | <0.01 | −63 | 63 |
| Comparative Example 7 | 357 | 100 | 0 | 41 | 1.46 | 0.002 | <0.002 | <0.005 | 0.003 | 0.026 | <0.01 | −68 | 68 |
| Comparative Example 8 | 289 | 73 | 27 | 187 | 1.76 | 0.007 | <0.002 | <0.005 | 0.003 | 0.001 | <0.01 | −21 | 21 |
| Comparative Example 9 | 390 | 100 | 0 | 219 | 1.82 | 0.004 | <0.002 | <0.005 | 0.005 | <0.01 | 0.22 | −19 | 19 |
| Comparative Example 10 | 410 | 100 | 0 | 197 | 1.79 | 0.003 | <0.002 | <0.005 | | | | | |
| Example 9 | 379 | 100 | 0 | 67 | 1.69 | 0.003 | <0.002 | <0.005 | | | | | |
| Example 10 | 408 | 100 | 0 | 95 | 1.59 | 0.004 | <0.002 | <0.005 | | | | | |
| Comparative Example 11 | 400 | 100 | 0 | 150 | 1.51 | 0.003 | <0.002 | <0.005 | | | | | |
| Comparative Example 12 | 408 | 100 | 0 | 320 | 1.86 | 0.006 | <0.002 | <0.005 | | | | | |
| Comparative Example 13 | 436 | 100 | 0 | 194 | 1.76 | 0.006 | <0.002 | <0.005 | | | | | |
| Example 11 | 347 | 100 | 0 | 69 | 1.60 | 0.003 | <0.002 | <0.005 | | | | | |
| Example 12 | 460 | 100 | 0 | 51 | 1.60 | 0.002 | <0.002 | <0.005 | | | | | |
| Comparative Example 14 | 426 | 100 | 0 | 23 | 1.81 | 0.003 | <0.002 | <0.005 | | | | | |

TABLE 2-continued

| | | | | | |
|---|---|---|---|---|---|
| Comparative Example 10 | 0.006 | <0.01 | 0.25 | −21 | 21 |
| Example 9 | 0.004 | 0.001 | 0.21 | −62 | 62 |
| Example 10 | 0.003 | 0.001 | 0.27 | −42 | 42 |
| Comparative Example 11 | 0.004 | 0.001 | 0.36 | −26 | 26 |
| Comparative Example 12 | 0.003 | <0.01 | 0.26 | −13 | 13 |
| Comparative Example 13 | 0.003 | <0.01 | 0.30 | −21 | 21 |
| Example 11 | 0.004 | 0.001 | 0.28 | −59 | 59 |
| Example 12 | 0.004 | 0.001 | 0.31 | −62 | 62 |
| Comparative Example 14 | 0.003 | 0.001 | 0.37 | −66 | 66 |

Table 2 is a summary of physical properties of the titanium oxide powders of Examples 1 to 12 and Comparative Examples 1 to 14. In the content in Table 2, there are places where the symbol "<" is used to indicate that the value is less than the numerical value following the symbol "<." For example, the Fe content in Comparative Example 1 is less than 0.002 mass %.

As shown in Table 2, the titanium oxide powders in Examples 1 to 12 have a zeta potential absolute value of 42 to 63 mV. The titanium oxide particles within this range have favorable dispersibility, do not become overly dispersed, and do not cause poor fluidity, making it suitable for synthesis of dielectric materials or battery materials.

On the other hand, the titanium oxide powders of Comparative Examples 1 to 6 and 8 to 13 have a zeta potential absolute value of 39 mV or less. It is known that when the zeta potential absolute value is small, particles are likely to aggregate with each other, and these titanium oxide particles have poor dispersibility. The titanium oxide powders of Comparative Examples 7 and 14 have a zeta potential absolute value of 66 mV or more. It is known that when the zeta potential absolute value is too large, the viscosity of a dispersion increases excessively due to over-dispersion, causing poor fluidity. Therefore, these titanium oxide particles are not suitable for use in synthesis, for example, as raw materials for barium titanate.

In addition, comparing the spin-spin relaxation time T2 between Examples 1 to 12 and Comparative Examples 1 to 14, the spin-spin relaxation time in Examples 1 to 14 is 42 to 99 ms, and it was confirmed that titanium oxide powders that do not become over-dispersed when they are reslurried to prepare a dispersion were produced.

From the comparison between the above-described examples and comparative examples, it was confirmed that, according to the present invention, an anatase-type titanium oxide powder with high specific surface area and high dispersibility can be provided.

The invention claimed is:

1. A titanium oxide powder having a BET specific surface area of 300 m$^2$/g to 480 m$^2$/g as measured through a nitrogen adsorption method, an anatase content of a crystalline phase of 90% or more as measured through XRD measurement, and a spin-spin relaxation time T2 of 46 ms to 103 ms obtained by performing pulsed NMR measurement of a 5 mass % suspension prepared using ion exchange water.

2. The titanium oxide powder according to claim 1, wherein a carbon content is 0.5 mass % or less.

3. The titanium oxide powder according to claim 1, wherein a chlorine content is 0.1 mass % or less, a silicon content is 0.1 mass % or less, and a sulfur content is 0.1 mass % or less.

4. The titanium oxide powder according to claim 1, wherein a half width of a diffraction peak with diffraction angles 2θ of 24.5° to 26.0° is 1.10° to 2.00°.

5. The titanium oxide powder according to claim 1, having a zeta potential of −63 mV to −40 mV.

* * * * *